United States Patent
Fan et al.

(10) Patent No.: US 12,440,829 B2
(45) Date of Patent: Oct. 14, 2025

(54) REGENERATION METHOD AND APPLICATION OF NITROGEN-CONTAINING CARBON CATALYST

(71) Applicants: DALIAN INSTITUTE OF CHEMICAL PHYSICS, CHINESE ACADEMY OF SCIENCES, Dalian (CN); FORMOSA PLASTICS CORPORATION, Taiwan (CN)

(72) Inventors: Sisi Fan, Dalian (CN); Jinming Xu, Dalian (CN); Yanqiang Huang, Dalian (CN); Hongmin Duan, Dalian (CN); Tao Zhang, Dalian (CN); Ming-Hung Cheng, Taiwan (CN); Wan-tun Hung, Taiwan (CN); Yu-Cheng Chen, Taiwan (CN); Chien-Hui Wu, Taiwan (CN); Ya-Wen Cheng, Taiwan (CN); Ming-Hsien Wen, Taiwan (CN); Chao-Chin Chang, Taiwan (CN); Tsao-Cheng Huang, Taiwan (CN); Lu-Chen Yeh, Taiwan (CN)

(73) Assignees: DALIAN INSTITUTE OF CHEMICAL PHYSICS, CHINESE ACADEMY OF SCIENCES;, Dalian (CN); FORMOSA PLASTICS CORPORATION, Taiwan (CN)

( * ) Notice: Subject to any disclaimer, the term of this patent is extended or adjusted under 35 U.S.C. 154(b) by 814 days.

(21) Appl. No.: 17/622,716

(22) PCT Filed: Nov. 26, 2020

(86) PCT No.: PCT/CN2020/131764
§ 371 (c)(1),
(2) Date: Mar. 2, 2022

(87) PCT Pub. No.: WO2021/139429
PCT Pub. Date: Jul. 15, 2021

(65) Prior Publication Data
US 2022/0241759 A1     Aug. 4, 2022

(30) Foreign Application Priority Data

Jan. 7, 2020 (CN) .......................... 202010014910.0

(51) Int. Cl.
| | | |
|---|---|---|
| B01J 27/28 | (2006.01) | |
| B01J 27/24 | (2006.01) | |
| B01J 38/02 | (2006.01) | |
| B01J 38/08 | (2006.01) | |
| C07C 17/25 | (2006.01) | |
| C07C 21/06 | (2006.01) | |

(52) U.S. Cl.
CPC .............. B01J 27/28 (2013.01); B01J 27/24 (2013.01); B01J 38/02 (2013.01); B01J 38/08 (2013.01); C07C 17/25 (2013.01); C07C 21/06 (2013.01); C07C 2527/24 (2013.01)

(58) Field of Classification Search
CPC ... B01J 27/28; B01J 27/24; B01J 38/02; B01J 38/08; C07C 17/25; C07C 21/06
See application file for complete search history.

(56) References Cited

FOREIGN PATENT DOCUMENTS

| CN | 105833892 A | 8/2016 |
|---|---|---|
| CN | 106881135 A | 6/2017 |
| CN | 109926081 A | 6/2019 |
| DE | 84182 | 9/1971 |
| JP | S5082002 A | 7/1975 |

OTHER PUBLICATIONS

Li et al., Applied Catalysis B: Environmental, (2017), V.210, p. 116-120.*
Xiaobin Dong, et al., Sulfur and nitrogen co-doped mesoporous carbon with enhanced performance for acetylene hydrochlorination, Journal of Catalysis, 2018, pp. 161-170, vol. 359.
Xingyun Li, et al., Deactivation mechanism and regeneration of carbon nanocomposite catalyst for acetylene hydrochlorination, Applied Catalysis B: Environmental, 2017, pp. 116-120, vol. 210.
Fangjie Lu, et al., Macroporous Carbon Material with High Nitrogen Content for Excellent Catalytic Performance of Acetylene Hydrochlorination, ChemistrySelect, 2020, pp. 878-885, vol. 5, Wiley-VCH Verlag Gmbh & Co. KGaA.
Xingyun Li, et al., Deactivation mechanism and regeneration of carbon nanocomposite catalyst for acetylene hydrochlorination, Applied Catalysis B: Environmental, 2017, pp. 116-120, vol. 210, Elsevier.

* cited by examiner

*Primary Examiner* — Yong L Chu
(74) *Attorney, Agent, or Firm* — Bayramoglu Law Offices LLC

(57) ABSTRACT

A regeneration method of a nitrogen-containing carbon catalyst includes the following steps: roasting the nitrogen-containing carbon catalyst in a nitrogen-containing atmosphere to obtain a regenerated nitrogen-containing carbon catalyst. The method is a universal method, which is suitable for nitrogen-doped carbon catalysts and can be used to regenerate a nitrogen-containing carbon catalyst for producing vinyl chloride (VC) through 1,2-dichloroethane cracking. The method can greatly reduce the production cost of the catalyst and increase the service life of the catalyst, and a regeneration process thereof is fast, simple, and controllable, and does not require high temperatures.

8 Claims, 2 Drawing Sheets

REGENERATION METHOD AND APPLICATION OF NITROGEN-CONTAINING CARBON CATALYST

CROSS REFERENCE TO THE RELATED APPLICATIONS

This application is the national phase entry of International Application No. PCT/CN2020/131764, filed on Nov. 26, 2020, which is based upon and claims priority to Chinese Patent Application No. 202010014910.0, filed on Jan. 7, 2020, the entire contents of which are incorporated herein by reference.

TECHNICAL FIELD

The present application relates to a regeneration method and use of a nitrogen-containing carbon catalyst, and belongs to the field of catalysts.

BACKGROUND

Polyvinyl chloride (PVC) is a universal synthetic resin material widely used around the world, and PVC is formed through the polymerization of the vinyl chloride monomer (VCM). There are mainly two production methods for VCM, where the first method is based on the addition reaction of acetylene and hydrogen chloride with mercury chloride as a catalyst, and the second method is based on the cracking of 1,2-dichloroethane (known as ethylene dichloride, EDC) with petroleum as a raw material. Due to the potential toxicity of mercury and the serious mercury pollution of mercury catalysts, the first method is gradually replaced by the second method, and thus it is of great significance to study the technology of producing VCM through the cracking of EDC. At present, the technology of producing VCM through the cracking of EDC used in industry is a pyrolysis technology without the action of a catalyst, which is conducted at 500° C. to 600° C. and leads to an EDC conversion rate of about 50%. The pyrolysis process has a series of problems such as high reaction temperature, high energy consumption, low safety, easy coking, frequent coke cleaning, and a short running period. The use of a catalyst can greatly reduce a cracking reaction temperature, increase the reaction selectivity, and alleviate a coking degree of a reactor. Most of the catalysts currently reported in patents are nitrogen-doped porous carbon catalysts, which have advantages such as a high EDC conversion rate and a prominent selectivity of the product VCM. However, carbon deposits and coke tar generated during the reaction will accumulate on the surface of the nitrogen-doped porous carbon material, thereby shortening a life cycle of the catalyst. Carbon deposits on aluminum silicate or molecular sieves can be removed by simple roasting in air, but carbon deposits on the porous carbon materials cannot be removed in this way because such an oxidation regeneration method will destroy the original skeleton structure of the porous carbon material while removing carbon deposits, thereby causing a reduction in the mechanical strength and activity of the catalyst. Therefore, how to realize the regeneration of deactivated porous carbon catalysts is one of the keys to the industrialized application of the porous carbon catalysts in the catalytic cracking of EDC.

SUMMARY

According to one aspect of the present application, a regeneration method of a nitrogen-containing carbon catalyst is provided.

The present disclosure provides a regeneration method of a nitrogen-containing carbon catalyst, including: roasting the nitrogen-containing carbon catalyst in a nitrogen-containing atmosphere to obtain a regenerated nitrogen-containing carbon catalyst.

Optionally, the nitrogen-containing carbon catalyst may be roasted in the nitrogen-containing atmosphere, and then cooled to obtain the regenerated nitrogen-containing carbon catalyst.

Optionally, the nitrogen-containing carbon catalyst may be roasted in the nitrogen-containing atmosphere, then the atmosphere may be switched to an inert atmosphere, and the nitrogen-containing carbon catalyst may be cooled to obtain the regenerated nitrogen-containing carbon catalyst.

Optionally, the nitrogen-containing carbon catalyst may include a nitrogen-doped carbon catalyst; in the nitrogen-containing carbon, a nitrogen element may be doped in a carbon material through a covalent bond; and a mass content of the nitrogen element in the nitrogen-containing carbon may be 0.1% to 20%.

Optionally, the nitrogen-containing carbon may be a carrier.

Optionally, the nitrogen-containing carbon may be loaded as an active component on a surface of an inorganic porous material.

The method is a universal method, which is suitable for nitrogen-doped carbon catalysts.

Optionally, the roasting may be conducted as follows: heating to the highest temperature of 300° C. to 850° C. at a heating rate of 0.1° C./min to 20° C./min, and keeping at the highest temperature for 0 min to 240 min.

Optionally, the roasting may be conducted as follows: heating to the highest temperature of 500° C. to 800° C. at a heating rate of 0.1° C./min to 5° C./min, and keeping at the highest temperature for 0 min to 60 min.

Optionally, the roasting may be conducted as follows: heating to the highest temperature of 300° C. to 800° C. at a heating rate of 0.1° C./min to 10° C./min, and keeping at the highest temperature for 0 min to 90 min.

Optionally, the roasting may be conducted as follows: heating to the highest temperature of 300° C. to 800° C. at a heating rate of 2° C./min to 10° C./min, and keeping at the highest temperature for 0 min to 90 min.

In the present application, the 0 min means that the nitrogen-containing carbon catalyst is cooled immediately after it is heated to a roasting temperature in the nitrogen-containing atmosphere.

Optionally, an upper limit of the heating rate may be selected from the group consisting of 0.5° C./min, 1° C./min, 2° C./min, 3° C./min, 4° C./min, 5° C./min, 6° C./min, 7° C./min, 8° C./min, 9° C./min, and 10° C./min; and a lower limit of the heating rate may be selected from the group consisting of 0.1° C./min, 0.5° C./min, 1° C./min, 2° C./min, 3° C./min, 4° C./min, 5° C./min, 6° C./min, 7° C./min, 8° C./min, and 9° C./min.

Optionally, an upper limit of the highest temperature may be selected from the group consisting of 350° C., 400° C., 500° C., 550° C., 600° C., 700° C., and 800° C.; and a lower limit of the highest temperature may be selected from the group consisting of 300° C., 350° C., 400° C., 500° C., 550° C., 600° C., and 700° C.

Optionally, an upper limit of the keeping time may be selected from the group consisting of 10 min, 20 min, 30 min, 40 min, 50 min, 60 min, 70 min, 80 min, and 90 min; and a lower limit of the keeping time may be selected from the group consisting of 0 min, 10 min, 20 min, 30 min, 40 min, 50 min, 60 min, 70 min, and 80 min.

Optionally, nitrogen in the nitrogen-containing atmosphere may be derived from at least one from the group consisting of ammonia and N$_2$O.

Optionally, the ammonia may be produced by pyrolysis of ammonium bicarbonate, ammonium carbonate, ammonia water, or a urea compound.

In principle, both organic and inorganic substances capable of producing ammonia through pyrolysis can be used as a source of the nitrogen-containing atmosphere in the present application.

Optionally, the nitrogen-containing atmosphere may be a mixed gas composed of a first gas and a second gas;

the first gas may be at least one from the group consisting of ammonia and N$_2$O; and the second gas may be an inert gas.

Optionally, a mass fraction of the first gas in the mixed gas may be 2% to 100%.

Optionally, a mass fraction of the first gas in the mixed gas may be 2% to 99.9%.

Optionally, a mass fraction of the first gas in the mixed gas may be 5% to 75%.

Optionally, a mass fraction of the first gas in the mixed gas may be 5% to 30%.

Optionally, a mass fraction of the first gas in the mixed gas may be 2% to 75%.

Optionally, an upper limit of the mass fraction of the first gas in the mixed gas may be selected from the group consisting of 2.5%, 5%, 10%, 15%, 20%, 25%, 30%, 40%, 45%, 50%, 55%, 60%, 70%, 75%, 80%, 85%, 90%, 95%, 99.9%, and 100%; and a lower limit of the mass fraction of the first gas in the mixed gas may be selected from the group consisting of 2%, 2.5%, 5%, 10%, 15%, 20%, 25%, 30%, 40%, 45%, 50%, 55%, 60%, and 70%.

Optionally, the inert gas may be at least one from the group consisting of nitrogen, argon, and helium.

The regeneration process changes the composition and structure of nitrogen-containing carbon and increases a content of the active component nitrogen, and the performance of the regenerated catalyst is equivalent to or even higher than that of the fresh catalyst.

Optionally, after the nitrogen-containing carbon catalyst is roasted in the nitrogen-containing atmosphere, a nitrogen content may be increased by 3% to 150%.

Optionally, after the nitrogen-containing carbon catalyst is roasted in the nitrogen-containing atmosphere, a nitrogen content may be increased by 3% to 130%.

Optionally, a nitrogen-containing carbon catalyst deactivated in the catalysis of a reaction to produce VC through EDC cracking may be placed in a nitrogen-containing atmosphere, and then heated from room temperature to a specified temperature and kept at the temperature for a specified time, then the atmosphere may be switched to an inert atmosphere, and the nitrogen-containing carbon catalyst may be naturally cooled to room temperature to obtain a regenerated catalyst, which can be directly used in a cracking reaction.

According to another aspect of the present application, use of the method in the regeneration of a nitrogen-containing carbon catalyst for EDC cracking to produce VC is provided.

According to another aspect of the present application, a method for producing VC through EDC cracking is provided.

The method for producing VC through EDC cracking includes the following steps:

vaporizing EDC, and introducing vaporized EDC into a reactor filled with a nitrogen-containing carbon catalyst; after the catalyst is deactivated, switching a reaction atmosphere to a nitrogen-containing atmosphere for regeneration; and after the regeneration is completed, switching the nitrogen-containing atmosphere back to the EDC-containing reaction atmosphere.

Optionally, the method and use for regenerating a catalyst for producing VC through EDC cracking may include: vaporizing EDC, and introducing vaporized EDC into a fixed bed/fluidized bed reactor filled with a catalyst; after the catalyst is deactivated, switching a reaction atmosphere to a nitrogen-containing atmosphere for regeneration; and after the regeneration is completed, switching the nitrogen-containing atmosphere back to the EDC-containing reaction atmosphere, thereby realizing the in-situ regeneration of the catalyst.

In the present application, unless otherwise specified, a given data range refers to any value selected from the range, and includes endpoint values of the range.

Possible beneficial effects of the present application:

(1) The regeneration method provided by the present application is widely applicable and is suitable for nitrogen-doped carbon materials, where nitrogen-containing carbon can be used as an active component or as a carrier, which can be beneficially improved through the regeneration method of the present application.

(2) The performance of a catalyst obtained after regeneration is stable, and the performance of a catalyst obtained after repeated regeneration is still not reduced compared with that of the fresh catalyst.

(3) In the traditional oxidation regeneration method, a deactivated catalyst is roasted to remove carbon deposits on a surface of the catalyst, thereby restoring the activity of the catalyst. Oxidation regeneration is a strong exothermic reaction, where a temperature is not easy to control and it is prone to temperature runaway, which will destroy a carbon layer of a catalyst itself. In contrast, the regeneration method in a nitrogen-containing atmosphere provided by the present application does not show high requirements on the temperature accuracy control, and the higher the temperature, the better the regeneration performance. The selectivity and conversion rate of the regenerated catalyst are comparable to that of the fresh catalyst.

(4) The regeneration process can be conducted in-situ in a reactor, which realizes the reuse of the catalyst and greatly reduces a preparation cost of the catalyst. A nitrogen source required by the regeneration in a nitrogen-containing atmosphere is cheap and easily available, making the catalyst have very promising industrial application prospects.

DETAILED DESCRIPTION OF THE EMBODIMENTS

Figure 1:
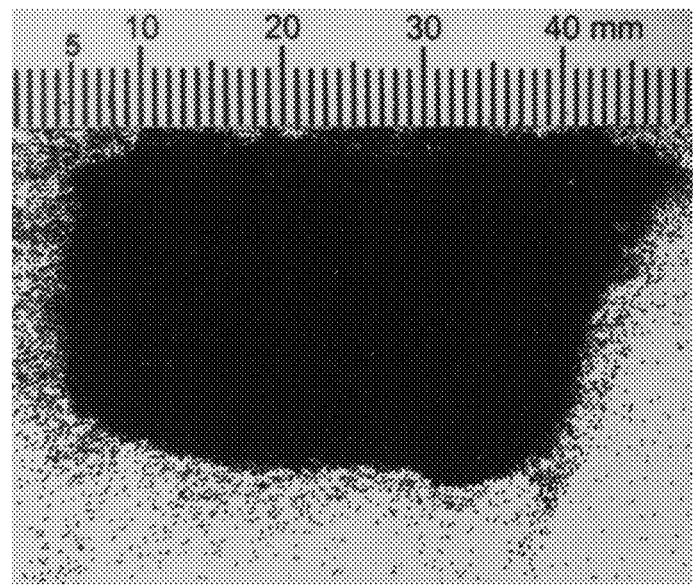
FIG. 1 is an outside view of a nitrogen-containing carbon catalyst sample supported by silica gel (Fresh-Cat #)

The present application will be described in detail below with reference to examples, but the present application is not limited to these examples. Those skilled in the art can adjust the regeneration conditions using the method provided in the present application according to actual needs to obtain different regeneration effects.

Unless otherwise specified, the raw materials and catalysts in the examples of the present application are all purchased from commercial sources. Unless otherwise specified, the test methods are all conventional methods, and the instrument settings are all those recommended by manufacturers.

The silica gel spheres are 80-120 mesh white coarse-pored microsphere silica gel purchased from Shandong Dongying Yiming New Material Co., Ltd.

Analysis methods in the examples of the present application are as follows:

A nitrogen content is determined by an EA3000 element analyzer of Leeman.

An EDC conversion rate and the VC selectivity are analyzed and determined through a fixed bed reactor, where EDC is carried by nitrogen into the reactor under bubbling, with a nitrogen flow rate of 2.5 ml/min, a bubbling temperature of 5° C., a catalyst filling amount of 0.2 g, and a bed residence time of 18.1 s.

In the present application, when a regenerated catalyst is used for EDC cracking to produce VC, there is an induction period in the reaction, and during the induction period, the conversion rate gradually increases over time and is stable after 3 days.

The conversion rate and selectivity in the examples of the present application are calculated as follows:

In the examples of the present application, the EDC conversion rate and the VC selectivity are calculated based on the number of moles:

EDC conversion rate=EDC consumed by a reaction (mol)/EDC introduced into a reactor (mol)× 100%

VC selectivity=VC produced by a reaction (mol)/ sum of all products produced by the reaction (mol)×100%

Preparation of a Nitrogen-Containing Carbon Catalyst Sample:

200 mL of furfuryl alcohol was added to a 1,000 mL beaker at room temperature, then 2.00 g of oxalic acid was added under stirring, and after the oxalic acid was dissolved, 300 mL of xylene was added; then 500 mL of coarse-pored microsphere silica gel was added to the beaker, and the beaker was placed in a 20° C. water bath to conduct impregnation for 6 h; excess liquid was removed through filtration, and then the silica gel was placed in a 1,000 mL beaker; and a polymerization reaction was conducted for 12 h in a 60° C. water bath, the temperature was raised to 90° C., and a polymerization reaction was further conducted for 12 h.

500 mL of the treated coarse-pored silica gel spheres was taken and put into a quartz tube of a rotary tube furnace, and nitrogen was introduced at a flow rate of 250 mL/min for 4 h to replace the air and dry the impregnated pellets spheres. In the rotary tube furnace, under the protection of nitrogen, the silica gel spheres were heated to 150° C. at 1° C./min and kept at the temperature for 3 h, then heated to 450° C. and kept at the temperature for 3 h, and then cooled to room temperature.

After the cooling under nitrogen, the nitrogen flow rate was changed to 45 mL/min, and an ammonia flow rate was 320 mL/min; gas replacement was conducted before a temperature rise; the silica gel spheres were heated to 800° C. at 5° C./min and kept at the temperature for 1.5 h; the introduction of ammonia was stopped, and the nitrogen flow rate was changed to 250 mL/min; and the silica gel spheres were cooled to 600° C. and kept at the temperature for 1.5 h, and then naturally lowered to room temperature. A mass percentage of nitrogen in the supported nitrogen-containing carbon material was 6.1%. The appearance of the sample was shown in FIG. 1, which was recorded as Fresh-Cat #.

EDC was charged under bubbling into a fixed bed reactor filled with the catalyst, with a reactor temperature of 250° C. and an EDC residence time (GHSV) of 18.1 s. Test results showed that an EDC conversion rate was 13%, and the VC selectivity was 99%. After 45 days of reaction, the EDC conversion rate was 10%, and the VC selectivity was 98%. A deactivated sample was recorded as 45d-Cat #.

REGENERATION EXPERIMENT

Example 1

Figure 2:
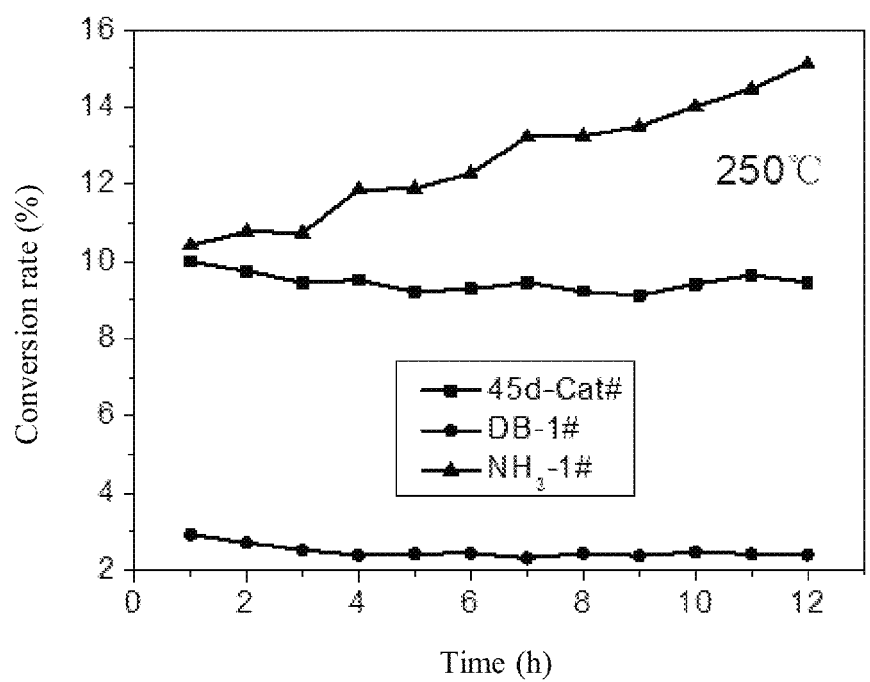
FIG. 2 is a schematic diagram illustrating the raw material conversion rates of the regenerated catalysts obtained in Example 1 and Comparative Example 1 that change with the reaction time.

The deactivated catalyst 45d-Cat # was placed in a mixed atmosphere of ammonia and nitrogen, heated from room temperature to 800° C., and subjected to a reaction for 1.5 h at 800° C.; and then the atmosphere was switched to nitrogen, and a product was naturally cooled to room temperature. A rate of the heating was 5° C./min, and a mass fraction of the ammonia was 50%, which was recorded as $NH_3$-1 #. An evaluation process of the regenerated catalyst was the same as the above process. An EDC conversion rate was 15%. A mass percentage of nitrogen in the supported nitrogen-containing carbon material was 14.1%. The EDC conversion rate changed with the reaction time, as shown in FIG. 2. The VC selectivity was 99%. It can be seen from FIG. 2 that a conversion rate of the regenerated catalyst during an induction period has reached more than 16%, which is better than a conversion rate of the fresh catalyst (13%); and during the induction period, the conversion rate gradually increases over time, and a stabilized conversion rate is higher than 16%, indicating that the performance of the catalyst can be restored through the regeneration process and the restored performance is better than the performance of the fresh catalyst. However, if the temperature is raised in an inert atmosphere and then a nitrogen-containing atmosphere (Comparative Example 1) is introduced, the conversion rate and selectivity of the catalyst will both decrease.

Comparative Example 1

This comparative example was basically the same as Example 1, except that the deactivated catalyst was first placed in a nitrogen atmosphere and heated from room temperature to 800° C.; and then the nitrogen atmosphere was switched to a mixed atmosphere of ammonia and nitrogen, and a reaction was conducted for 1.5 h. A product was recorded as DB-1 #. A mass percentage of nitrogen in the supported nitrogen-containing carbon material was 17.6%. A catalyst evaluation process was the same as the above process, and the reaction was conducted at 250° C. An EDC conversion rate was 3%, and the VC selectivity was 92%. The EDC conversion rate was shown in FIG. 2. It can be seen that, although a mass content of nitrogen in the supported nitrogen-containing carbon material increases in the catalyst treated by this method, the regeneration of the catalyst cannot be achieved due to the different treatment order. This is because in an atmosphere without ammonia, the catalyst is irreversibly destroyed at a high temperature, and it is difficult to regenerate the catalyst even if an ammonia-containing gas is then introduced.

Example 2

Figure 3:
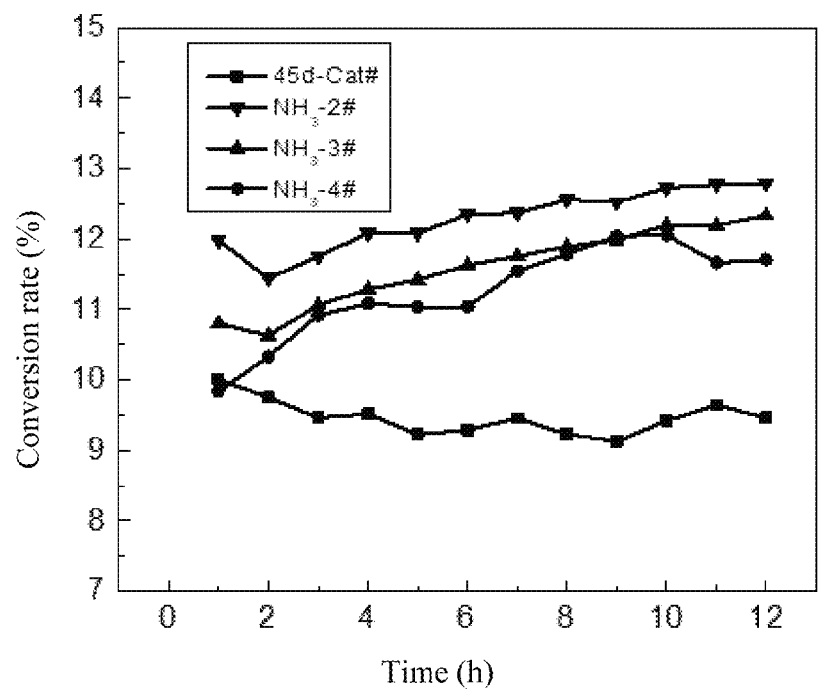
FIG. 3 is a schematic diagram illustrating the raw material conversion rates of the regenerated catalysts obtained in Examples 2, 3, and 4 that change with the reaction time.

The deactivated catalyst was placed in a mixed atmosphere of ammonia and nitrogen and heated from room temperature to 550° C., then the atmosphere was immediately switched to nitrogen, and a product was naturally cooled to room temperature. A rate for the heating was 5° C./min, and a mass fraction of the ammonia was 25%, which was denoted as $NH_3$-2 #. A mass percentage of nitrogen in the supported nitrogen-containing carbon material was 6.5%. An evaluation process of the regenerated catalyst was the same as the above process, and the reaction was conducted at 250° C. An EDC conversion rate was 12%, as shown in FIG. 3; and the VC selectivity was 99%. After the induction period, a stabilized EDC conversion rate was higher than 13%.

Example 3

This example was different from Example 2 in that a mass fraction of ammonia was 75%, which was recorded as $NH_3$-3 #; a mass percentage of nitrogen in the supported nitrogen-containing carbon material was 6.3%; an evaluation process of a regenerated catalyst was the same as the above process, and the reaction was conducted at 250° C.; an EDC conversion rate was 11%, as shown in FIG. 3; and the VC selectivity was 99%. After the induction period, a stabilized EDC conversion rate was higher than 13%.

Example 4

This example was different from Example 3 in that the temperature was kept at 550° C. for 1 h, which was recorded as NH 3-4 #; a mass percentage of nitrogen in the supported nitrogen-containing carbon material was 6.9%; an evaluation process of a regenerated catalyst was the same as the above process, and the reaction was conducted at 250° C.; an EDC conversion rate was 10%, and the reaction performance was shown in FIG. 3; and the VC selectivity was 99%. After the induction period, a stabilized EDC conversion rate was higher than 13%.

FIG. 3 is a schematic diagram illustrating the raw material conversion rates of the regenerated catalysts obtained in Examples 2, 3, and 4 that change with the reaction time.

Example 5

This example was different from Example 2 in that a heating rate was 0.1° C./min.

Example 6

This example was different from Example 2 in that a heating rate was 10° C./min.

Example 7

This example was different from Example 2 in that a mass fraction of ammonia was 2%.

Example 8

This example was different from Example 2 in that a mass fraction of ammonia was 5%.

Example 9

This example was different from Example 2 in that a mass fraction of ammonia was 15%.

The regenerated catalysts in Examples 5 to 9 were evaluated by the same evaluation process as in Example 2, and the reaction was conducted at 250° C. After the induction period, the VC selectivity was 99%, and the EDC conversion rate was higher than 13%.

Example 10

This example was different from Example 3 in that the highest temperature for regeneration was 300° C.; after the regeneration, a mass percentage of nitrogen in the supported nitrogen-containing carbon material was 6.4%; an evaluation reaction was conducted at 250° C.; and an EDC conversion rate was 8%, and the VC selectivity was 99%. After the induction period, a stabilized EDC conversion rate was higher than 13%.

Example 11

This example was different from Example 3 in that the highest temperature for regeneration was 600° C.; after the regeneration, a mass percentage of nitrogen in the supported nitrogen-containing carbon material was 6.6%; an evaluation reaction was conducted at 250° C.; and an EDC conversion rate was 15%, and the VC selectivity was 99%. After the induction period, a stabilized EDC conversion rate was higher than 15%.

It can be seen that the regeneration method of the present application is very convenient and efficient, for example, in Example 2, a very short residence time can achieve prominent regeneration performance. The regeneration method of the present application is very economical, for example, in Example 7, excellent regeneration performance can be achieved at a relatively low ammonia concentration, which can greatly reduce the regeneration cost.

The above examples are merely few examples of the present application, and do not limit the present application in any form. Although the present application is disclosed as above with preferred examples, the present application is not limited thereto. Some changes or modifications made by any technical personnel familiar with the profession using the technical content disclosed above without departing from the scope of the technical solutions of the present application are equivalent to equivalent implementation cases and fall within the scope of the technical solutions.

What is claimed is:

1. A regeneration method of a nitrogen-containing carbon catalyst, comprising:
    roasting the nitrogen-containing carbon catalyst in a nitrogen-containing atmosphere to obtain a treated nitrogen-containing carbon catalyst, wherein the nitrogen-containing atmosphere is a mixed gas composed of a first gas and a second gas, the first gas is at least one from the group consisting of ammonia and $N_2O$, the second gas is an inert gas, and a mass fraction of the first gas in the mixed gas is less than or equal to 25%;
    then switching the nitrogen-containing atmosphere to an inert atmosphere; and
    cooling the treated nitrogen-containing carbon catalyst in the inert atmosphere to obtain a regenerated nitrogen-containing carbon catalyst.

2. The method according to claim 1, wherein the nitrogen-containing carbon catalyst comprises a nitrogen-doped carbon catalyst; in the nitrogen-containing carbon catalyst, a nitrogen element is doped in a carbon material through a covalent bond; and a mass fraction of the nitrogen element in the nitrogen-containing carbon catalyst is 0.1% to 20%.

3. The method according to claim 1, wherein a process of the roasting comprises: heating to a highest temperature of 300° C. to 850° C. at a heating rate of 0.1° C./min to 20° C./min, and keeping at the highest temperature for 0 min to 240 min.

4. The method according to claim 1, wherein a process of the roasting comprises: heating to a highest temperature of 300° C. to 800° C. at a heating rate of 0.1° C./min to 10° C./min, and keeping at the highest temperature for 0 min to 90 min.

5. The method according to claim 1, wherein nitrogen in the nitrogen-containing atmosphere is derived from the first gas.

6. The method according to claim 1, wherein the inert atmosphere is at least one from the group consisting of nitrogen, argon, and helium.

7. The method according to claim 1, wherein after the nitrogen-containing carbon catalyst is roasted in the nitrogen-containing atmosphere, a nitrogen content of the treated nitrogen-containing carbon catalyst compared to the nitrogen-containing carbon catalyst is increased by 300 to 15000.

8. A method for producing VC through 1,2-dichloroethane cracking, comprising the following steps:
  vaporizing 1,2-dichloroethane to obtain vaporized 1,2-dichloroethane, and introducing the vaporized 1,2-dichloroethane into a reactor filled with a nitrogen-containing carbon catalyst;
  after the nitrogen-containing carbon catalyst is deactivated, switching a 1,2-dichloroethane-containing reaction atmosphere to a nitrogen-containing atmosphere for regeneration; and
  after the regeneration is completed, switching the nitrogen-containing atmosphere back to the 1,2-dichloroethane-containing reaction atmosphere.

* * * * *